United States Patent [19]
Spear

[11] 3,806,166
[45] Apr. 23, 1974

[54] DATA ENTRY SYSTEM AND APPARATUS

[76] Inventor: Woodrow Spear, 75 Great Hills Rd., Short Hills, N.J. 07028

[22] Filed: Nov. 17, 1972

[21] Appl. No.: 307,615

[52] U.S. Cl.......................... 283/55, 281/16, 281/17
[51] Int. Cl............................................. B42d 15/00
[58] Field of Search .................. 283/55; 281/16, 17; 282/22, 23, 29 R, 29 A, 29 B

[56] References Cited
UNITED STATES PATENTS

| | | | |
|---|---|---|---|
| 3,489,433 | 1/1970 | Lanigan et al. ........................ | 283/55 |
| 2,283,584 | 5/1942 | Sloan .................................... | 281/16 |
| 2,113,099 | 4/1938 | Sloan .................................... | 281/17 |
| 3,421,239 | 1/1969 | Smith .................................... | 283/18 X |

Primary Examiner—Lawrence Charles

[57] ABSTRACT

Code identification of ordered goods and associated information is periodically entered on an input data sheet positioned on the base panel of a folder adjacent to a binder holding an assembly of computer print outs from which the identification code is obtained. A log of removable code labels is also positioned by the folder adjacent the base panel from which labels are transferred to the input data sheet to assign identification codes to ordered goods for which no code identification appear in the computer print outs.

11 Claims, 8 Drawing Figures

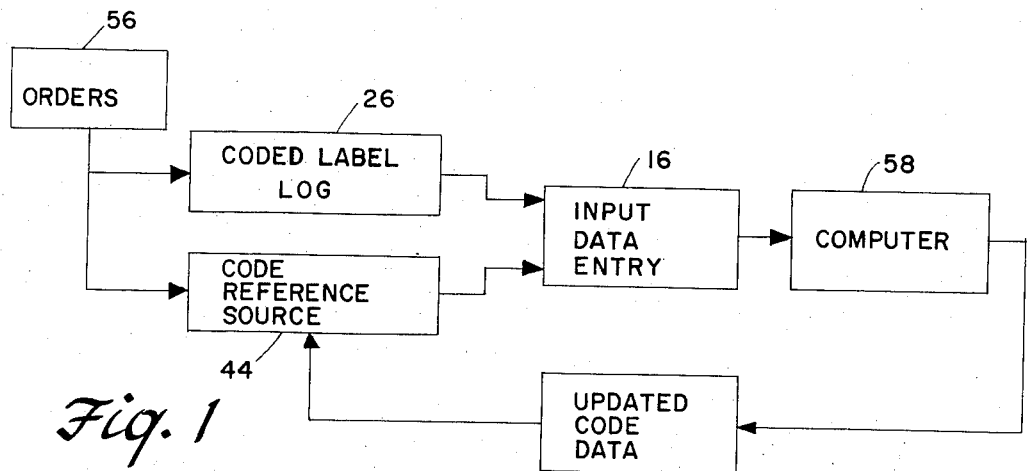
Fig. 1
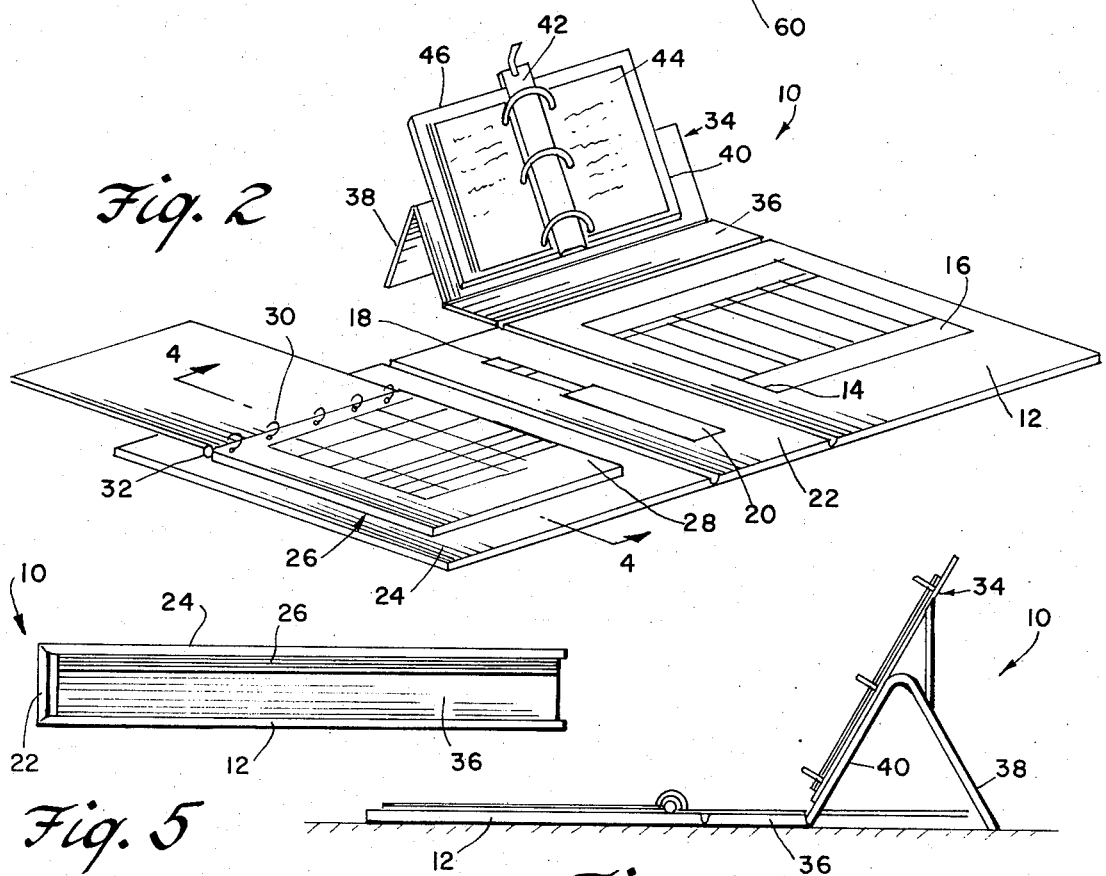
Fig. 2
Fig. 5
Fig. 3
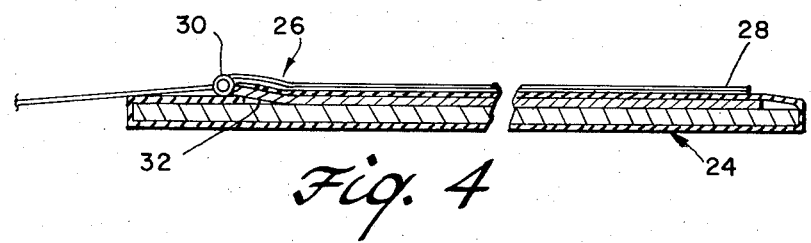
Fig. 4

PATENTED APR 23 1974 3,806,166

(ACCOUNT NAME)
COMPOSITE REPORT  MONTHLY USAGE
 1          2          3      4
CODE                          UNIT
NUMBER   DESCRIPTION  UNIT   PRICE

01180         RIBBONS... EACH    .71
01185

*Fig. 8*

MONTHLY CONFIRMING ORDER — ACCOUNT — ACCT NO. — PERIOD ENDING

DATE | CHARGE DEPT. NO. | CODES (NON-INVEN ITEM / INV. ITEM) | NEW | QUANT. | UNIT | UNIT PRICE | REC'
2/16 | | 0 1 1 8 0 | | | EA | 71 ✓ RIBBON
2/16 | 50031 | 0 — 0 | ✓ | | EA | 600 ✓ D 1 0 1 1 0

*Fig. 7*

DATA ENTRY SYSTEM AND APPARATUS

This invention relates to a record keeping system for the distribution of merchandise such as office supplies and more particularly to the entry of input data adapted to be computer processed.

The distribution of large quantities of goods such as office supplies flowing from manufacturers to consumers requires the establishment and maintenance of records for ordering and maintaining updated inventories of supplies in the orderly conduct of business. Because of the large amount of merchandise and transactions involved and the corresponding volume of data that must be recorded and processed, there has been a widespread use of computer systems for processing data, presentation of data on computer print outs and the creation of printed forms for the entry of computer input data by clerical personnel. Essential to the operation of such computer systems are the assignment of identification codes to the numerous items of merchandise.

Although computer systems have been devised that will allegedly process data without error, such systems have been plagued by errors generally attributed to input error on the part of clerical personnel. Often, these errors arise from the incorrect and duplicated use of identification codes and from the failure to add new code identifications to the system after use. In an effort to reduce such input error, relatively complex, expensive and time consuming procedures have been instituted to minimize, detect and locate errors with a corresponding proliferation of records and printed forms. It is therefore an important object of the present invention to provide a relatively simple method and apparatus for entering input data while avoiding human input errors.

In accordance with the present invention clerical personnel responsible for periodically entering input data on a printed record sheet, such as a monthly confirming order form, is provided with a folder having a base panel on which the input data form is positioned. The folder includes an easel supported, ring binder assembly holding a source of reference codes in the form of computer print out reports containing information on merchandise including the description of inventory items and code numbers assigned thereto. The inventory items are listed on the reports in an alpha-numeric index arrangement to facilitate search and location of code numbers for items to be recorded on the input data form with a writing implement. A log of unassigned code number labels are removably stored on index sheets in the same alpha-numeric arrangement, said log sheets being held on a cover panel of the folder adjacent to the base panel. When non-inventoried items are ordered and accordingly have no code identification on the current print out reports, a code number is assigned thereto from the log by removal of a code label and placement thereof on the input data form. Thus, duplicate use of new code numbers is avoided without any complicated entry procedure or any listing of used code numbers.

A detailed description of the drawings in conjunction with the present invention now follows, in which:

FIG. 1 is a schematic block diagram illustrating the method associated with the system of the present invention;

FIG. 2 is a perspective view of the folder assembly of the present invention opened for use;

FIG. 3 is a side elevation view of the opened folder assembly shown in FIG. 1;

FIG. 4 is an enlarged partial sectional view taken substantially through a plane indicated by section line 4—4 in FIG. 2;

FIG. 5 is a side elevation view of the folder assembly in a folded condition;

FIG. 6 illustrates a portion of a typical computer print out report utilized as a code reference source in the system of the present invention;

FIG. 7 illustrates a portion of the unassigned identification code log utilized in the system; and FIG. 8 illustrates a portion of a typical data input form utilized in the system.

Referring now to the drawings in detail, FIGS. 2 and 3 illustrate a control book folder assembly generally referred to by reference numeral 10. FIG. 5 shows the folder assembly in a closed condition for storage while in disuse. When opened the folder assembly exposes the inside of a rectangular base panel 12 provided with a retention slot 14 for holding a record medium such as the sheet of paper 16 constituting an input data form that may be preprinted for reception of input data as more clearly seen in FIG. 8. The base panel 12 forms a suitable writing support for the sheet 16 in which input data is recorded by clerical personnel utilizing a writing implement such as a pencil or pen 18 conveniently stored in a pocket 20 on an edge portion 22 of the folder assembly as shown in FIG. 2.

A rectangular cover panel 24 is connected to the base panel 12 by the edge portion 22 so that its inside surface will form a support for an unassigned identification code number log 26 as shown in FIGS. 2 and 4. The cover plane is adapted to be positioned in coplanar relation to the base panel upon opening of the folder assembly so as to expose the log 26 which may be formed by a plurality of index sheets 28 held together by a ring binder 30 with a cover leaf inserted into a slot 32 formed on the inside of the cover panel to hold the log in position. The index sheets 28 of the log to be described in detail hereafter are more clearly seen in FIG. 7.

An easel supported binder assembly 34 is connected to the bae panel 12 by a second edge portion 36 disposed at right angles to the edge portion 22. The binder assembly includes an outer, foldable support panel 38 connected to an inner support panel 40 to which the edge portion 36 is connected. A conventional type of releasable ring binder 42 is secured to the inner panel 40 for holding an assembly of computer print out report sheets 44 between cover leaves 46. The print out sheets 44 constitute a reference source of identification code numbers as more clearly seen in FIG. 6. The binder assembly 34 may be unfolded flat and turned in between the base and cover panels in the folded condition of the folder assembly.

The sheets 44 as shown in FIG. 6 by way of example, contain a current, updated report listing inventoried items by description and code numbers 48 as well as other necessary information. The items on the reports are listed in accordance with an alpha-numeric or A–Z index arrangement so that identification code numbers may be quickly located for each item denoted on an order form by description. Inventoried items periodically ordered by a distributor of office supplies may therefore be recorded on a sheet 16 as shown in FIG. 8 utilizing the information obtained from orders and the identification code numbers 48 obtained from the print out report sheets 44.

Certain new items ordered during a period of time may not be inventoried by the distributor utilizing the system of the present invention and no identification code number would be listed for such items in the code reference sheets 44. Accordingly, new identification code numbers 50 must be assigned to such items when recorded on the data input sheet 16 as shown in FIG. 8. These new code numbers are printed on adhesive backed labels 52 applied directly to the sheet 16 in the appropriate space as shown. The code labels are obtained from the log 26 in which the labels are stored prior to code number assignment. The log consists of a plurality of index sheets 28 as shown in FIG. 7 with the code labels 52 removably held on the sheets by a pressure sensitive adhesive. The labels are arranged on the index sheets in the same alpha-numeric arrangement as items are listed in the sheets 44 of the code reference source so that appropriate code number assignments may be made for non-inventoried items by transfer of code labels 52 from the log to the data input sheet 16. When such transfer is made, a blank space 54 will be left in the log and the same code number can no longer be assigned. The new code number will thereafter appear in the code reference source when updated report sheets 44 are placed in the folder assembly replacing the out-dated sheets 44. A separate listing of used code numbers and descriptions are not necessary and because the new code numbers 50 are preprinted on the labels 52, there can be no error in transposing.

FIG. 1 diagrams and summarizes the flow of information in accordance with the present invention as hereinbefore described. Information obtained from orders 56 is utilized by clerical personnel to locate code numbers either in the code reference source 44, for inventoried items, or new code number assignments are made by removal of code labels from the log 26. Code numbers from source 44 are recorded with writing implements on the input data sheet 16 while code labels are transferred to the same input data sheet from the log. The information so transposed to the input data sheet is then entered into the computer 58 from which updated code data 60 is obtained for inclusion in the code reference source. The new code number assignments are thereby added to the system.

What is claimed is:

1. In a system for recording code data derived from a reference source on a record medium, a method of introducing additional code identification to the system, comprising the steps of: storing code identification in a visible log; removing selected code identification from said log; and transferring said selected code identification to the same record medium on which the code data is recorded.

2. The system of claim 1, wherein said additional code identification is stored on labels removably attached to the log.

3. The system of claim 2, wherein said record medium is a sheet of paper to which said labels are applied to transfer the code identification from the log.

4. The system of claim 3, wherein the code data derived from the reference source corresponds to inventoried items while the additional code identification corresponds to non-inventoried items.

5. The system of claim 4, wherein the code data in the reference source and the code identification stored in the visible log are indexed in the same manner for location of code data and assignment of additional code identification, respectively.

6. The system of claim 1, wherein the code data derived from the reference source corresponds to inventoried items while the additional code identification corresponds to non-inventoried items.

7. The system of claim 1, wherein the code data in the reference source and the code identification stored in the visible log are indexed in the same manner for location of code data and assignment of additional code identification, respectively.

8. In combination with a data processing system from which a printout is obtained containing updated code data, a method of entering input data into the system from a source, including the steps of: coding input data from the source in terms of the updated code data on the printout; storing code indicia in a visible log; assigning code indicia from the log to input data not codable from the updated code data in the printout; recording the coded input data on a record medium; and transferring the assigned code indicia from the log to said record medium for presentation to the system with the coded input data.

9. The method of claim 8 in which said source is an order for inventoried goods identified by the coded input data and non-inventoried goods identified by the assigned code indicia.

10. The method of claim 9 in which said code indicia is in the form of printed labels removably mounted in the log and adapted to be secured to the record medium.

11. The method of claim 8 in which said code indicia is in the form of printed labels removably mounted in the log and adapted to be secured to the record medium.

* * * * *